US005522234A

United States Patent [19]
Yoo et al.

[11] Patent Number: 5,522,234
[45] Date of Patent: Jun. 4, 1996

[54] AIR CONDITIONER HAVING SUPPLEMENTAL GAS HEATER FOR OUTDOOR COIL

[75] Inventors: Si H. Yoo, Seoul; Nack H. Jung; Jong H. Choi, both of Suwon, Rep. of Korea

[73] Assignee: Samsung Electronics Co., Ltd., Suwon, Rep. of Korea

[21] Appl. No.: 205,374

[22] Filed: Mar. 4, 1994

[30] Foreign Application Priority Data

| Mar. 6, 1993 | [KR] | Rep. of Korea | 93-3393 |
| Mar. 19, 1993 | [KR] | Rep. of Korea | 93-4129 U |
| Mar. 19, 1993 | [KR] | Rep. of Korea | 93-4130 U |
| Mar. 23, 1993 | [KR] | Rep. of Korea | 93-4341 U |
| Mar. 23, 1993 | [KR] | Rep. of Korea | 93-4343 U |
| Mar. 23, 1993 | [KR] | Rep. of Korea | 93-4344 U |
| Mar. 23, 1993 | [KR] | Rep. of Korea | 93-4345 U |
| Apr. 30, 1993 | [KR] | Rep. of Korea | 93-7182 U |
| May 31, 1993 | [KR] | Rep. of Korea | 93-9355 U |

[51] Int. Cl.$^6$ .............................. F25B 1/00; F25B 29/00; F28D 1/04
[52] U.S. Cl. .......................... 62/238.7; 62/238.6; 165/29; 165/140; 237/2 B
[58] Field of Search ................... 62/238.6, 238.7; 165/140, 29; 237/2 B

[56] References Cited

U.S. PATENT DOCUMENTS

| 4,441,546 | 4/1984 | Vandervaart | 62/238.7 |
| 4,506,521 | 3/1985 | Asano et al. | 62/238.7 |
| 5,174,365 | 12/1992 | Noguchi et al. | 165/29 |

FOREIGN PATENT DOCUMENTS

| 2547027 | 12/1984 | France | 62/238.6 |
| 2946698 | 5/1981 | Germany | 62/238.6 |
| 0033288 | 2/1987 | Japan | 165/140 |
| 0070093 | 3/1988 | Japan | 62/238.7 |
| 0171558 | 7/1990 | Japan | 62/238.7 |

*Primary Examiner*—John K. Ford
*Attorney, Agent, or Firm*—Burns, Doane, Swecker & Mathis

[57] ABSTRACT

An air conditioner includes a compressor, an indoor heat exchanger, an expansion tube, and an outdoor heat exchanger interconnected by refrigerant conduits for operation in cooling and heating modes. In a cooling mode, the outdoor heat exchanger conducts ambient air horizontally across heat exchange coils. In a heating mode, the outdoor heat exchanger conducts heated air from an auxiliary gas-fired heater upwardly across those same coils. The outdoor heat exchanger includes movable blades for creating the horizontal and vertical air flow passages for the cooling and heating modes.

2 Claims, 10 Drawing Sheets

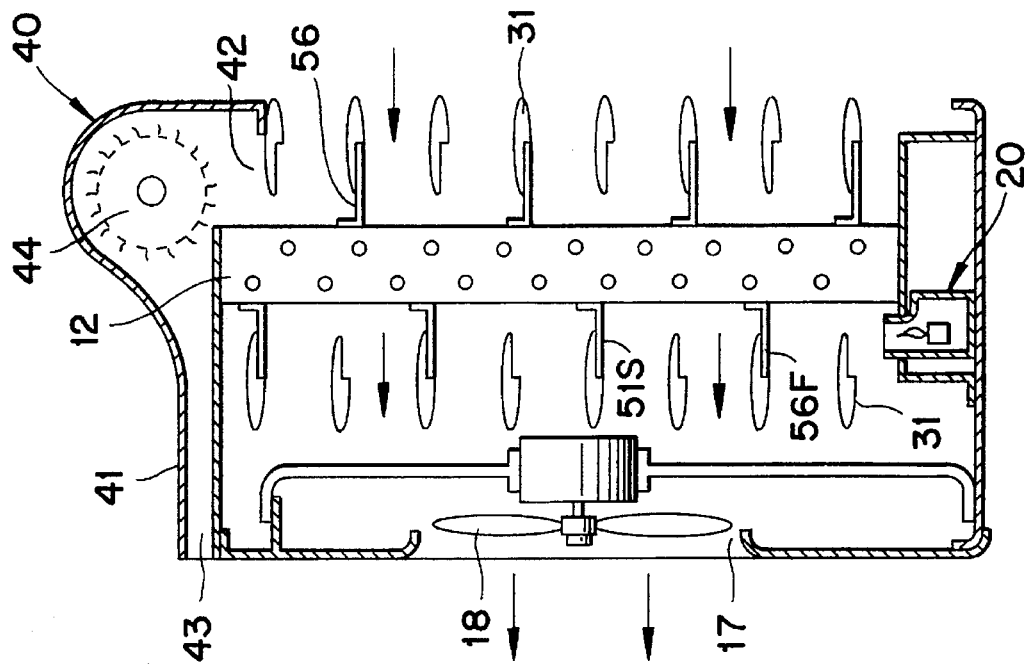
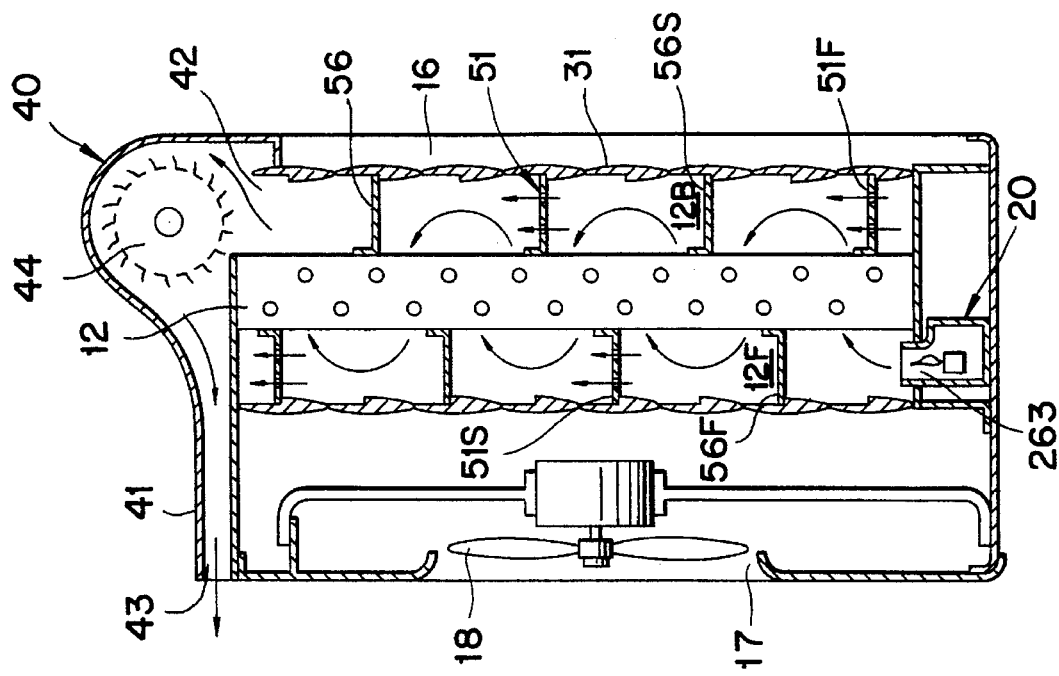

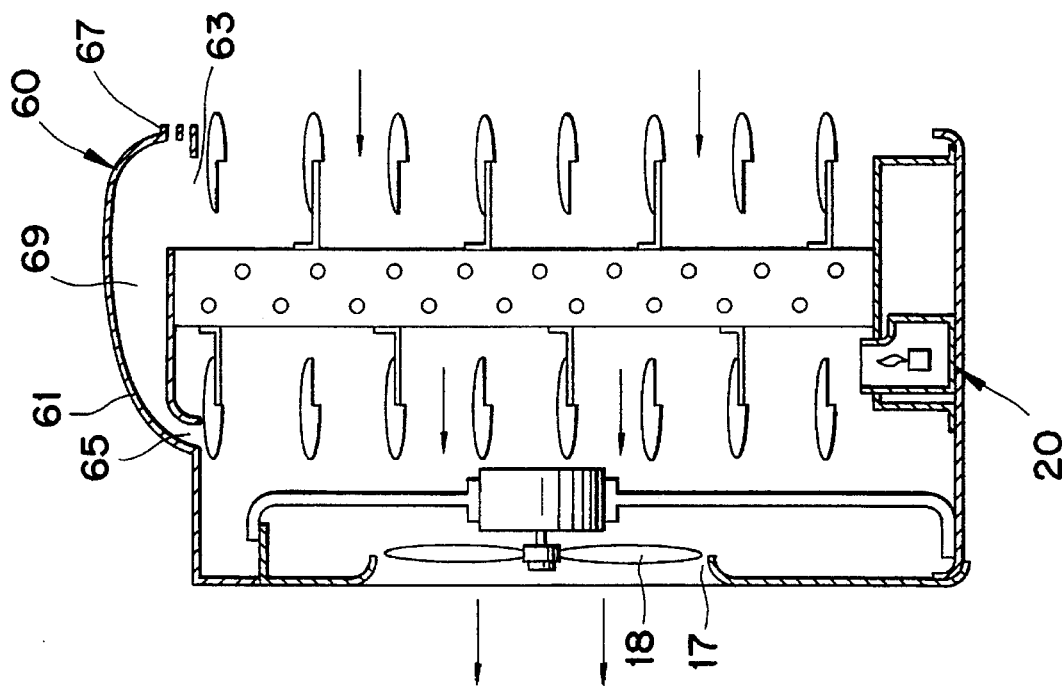
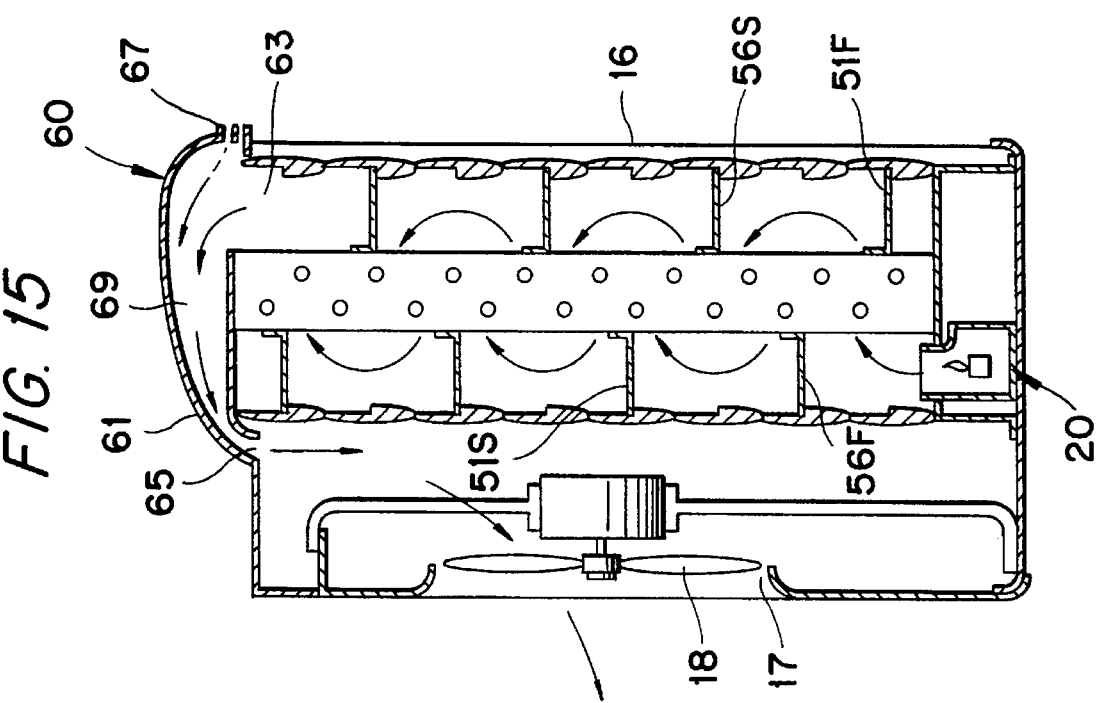

AIR CONDITIONER HAVING SUPPLEMENTAL GAS HEATER FOR OUTDOOR COIL

BACKGROUND OF THE INVENTION

This invention relates to an air conditioner which has a heating burner for indirectly heating a refrigerant of the outdoor heat exchanger in an external unit of the air conditioner, wherein the outdoor heat exchanger is used in the heating mode of operation as well as in the cooling mode of operation.

A conventional air conditioning system is illustrated in FIG. 1, which comprises an external unit 8 and an internal unit 9. The external unit 8 has a compressor 81, an outdoor heat exchanger 86 and an expansion tube 83 which are connected in a serial manner. Between the compressor 81 and the outdoor heat exchanger 86 a four way valve 84 is placed. Between the expansion tube 83 and the compressor 82 is installed an auxiliary heat exchanger 82 which is heated by a burner 89, thereby serving a refrigerant circulation in those members when in the heating mode of operation. Further, the internal unit has an indoor heat exchanger 91 which is connected with both the expansion tube 83 and the 4-way valve 84. In the cooling mode (chain arrow C), the gaseous refrigerant compressed by the compressor 81 flows into the outdoor heat exchanger 86 to perform a heat exchange. Next, the gaseous refrigerant is changed into a liquefied state and flows into the expansion tube 83 through the first check valve 87. The liquefied refrigerant via the expansion tube is converted into a low temperature and a low pressure one and flows into the indoor heat exchanger 91. The indoor heat exchanger absorbs heat from the indoors, and the liquefied refrigerant is changed into a gaseous state and passes the second check valve 88 and reaches the compressor 81. During its circulation the cooling mode is achieved. During this operation the burner of the auxiliary heat exchanger 82 is not operated and the two-way valve 85, which is mounted at the front of the auxiliary heat exchanger, is closed.

In the heating mode (solid arrow H), the high temperature and high pressure gaseous refrigerant, which is compressed by the compressor 81, flows into the indoor heat exchanger 91 via the 4-way valve 84. During the heat exchange of the indoor heat exchanger the gaseous refrigerant is changed into a liquefied state. As the two way valve 85 is opened and the operation of the burner 89 starts at this time, the liquefied refrigerant heat-exchanged through the indoor heat exchanger 91 flows into the auxiliary heat exchanger 82 via the two way valve 85. The refrigerant of the auxiliary heat exchanger 82 is heated by the burner 89 to change into the gaseous state and the gaseous refrigerant flows back into the compressor 84. During this cycle, the heating mode is achieved. The typical refrigerant heating type air conditioners are disclosed in U.S. Pat. Nos. 4,506,521 and 5,174,365.

However, because an auxiliary heat exchanger, which is comprised of the additional part of the outdoor heat exchanger, is employed in the heating cycle of the above described air conditioner, there is a problem in that a complex structure is required. Further, during the initial operation of the heating mode, there is a problem in that the refrigerant is collected from the outdoor heat exchanger to prevent the heating efficiency from decreasing.

SUMMARY OF THE INVENTION

The object of the present invention is to provide an air conditioner in which the structure as well as the control of its operation is simpler.

Another object of the present invention is to provide an air conditioner which can perform the heating mode without collecting a refrigerant from an outdoor heat exchanger.

Another object of the present invention is to provide an air conditioner with an interrupting means by which the outdoor air can not be introduced into the outdoor heat exchanger when in the heating mode.

Another object of the present invention is to provide an air conditioner having a heating means in which the heat air generated by the heating means heats the outdoor heat exchanger more effectively.

Another object of the present invention is to provide an air conditioner having a heat air conducting means which increases a heat exchange efficiency of the outdoor heat exchanger when in the heating mode.

According to the present invention, an air conditioner is provided with a compressor which compresses a refrigerant;

an indoor heat exchanger, an expansion tube and an outdoor heat exchanger which are connected in series with the compressor for feeding the compressed refrigerant when in cooling operation;

a guiding means for feeding directly to the indoor heat exchanger the refrigerant which had performed a heat exchange at the outdoor heat exchanger when in heating operation; and a heating apparatus for heating the refrigerant which is in the outdoor heat exchanger.

Furthermore, the air conditioner comprises an external unit and an internal unit, the external unit has an expansion tube, an outdoor heat exchanger, compressor and four way valve which are connected in series. The external unit further has a heating apparatus for heating a refrigerant which is in the outdoor heat exchanger, and an interrupting means, whereby a passage for a heat air flow is formed adjacent the outdoor heat exchanger and the air heated by the heating apparatus passes through the outdoor heat exchanger. The external unit further comprises an exhaust fan for exhausting the air through the passage to the outdoor.

Furthermore, an exhaust opening of the heating means is directed to one surface between the front or rear surface of the lower portion of the outdoor heat exchanger, and the heated air is blown out at the higher portion thereof.

Furthermore, a conducting means is provided for the heated air to flow along to the top of the heat exchanger in a zig-zag manner, for even heating of the refrigerant of the outdoor heat exchanger.

Furthermore, the external unit comprises a plurality of blades which are operated simultaneously, and a transition means which is changed by the linear motion of an acting member into a swing motion of the blades.

Furthermore, the transition means comprises an acting link, one end thereof is connected to one end of the blade by a shaft and the other end thereof is connected by the acting member which is movable.

In the cooling mode, the interrupting means of the external unit is opened to permit the outside air to pass through the outdoor heat exchanger.

In the heating mode, the linear moving member moves in one direction and the transition means moves simultaneously to swing the blades. The blades are arrayed vertically to close both the air incoming portion and the outgoing portion of the outdoor heat exchanger. The heat air generated by the heating apparatus flows up by the operation of the cross fan. The heated air flows up in a zig-zag manner, which is induced by the conducting member, through the air passage which is created by the interrupting means. Then the heat is absorbed by the refrigerant of the outdoor heat exchanger, and heat exchanged air is blown out through the passage.

BRIEF DESCRIPTION OF THE DRAWINGS

The invention will now be explained with reference to the accompanying drawings in which:

FIG. 13 is a side crosssectional view of an external unit in a heating mode;

FIG. 14 is a side crosssectional view of an external unit in a cooling mode;

FIG. 15 is a side crosssectional view of an alternative embodiment of an external unit in a heating mode; and FIG. 16 is a side crosssectional view of the external unit of FIG. 15 in a cooling mode.

EXPLANATION OF THE PREFERRED EMBODIMENTS

Figure 1:
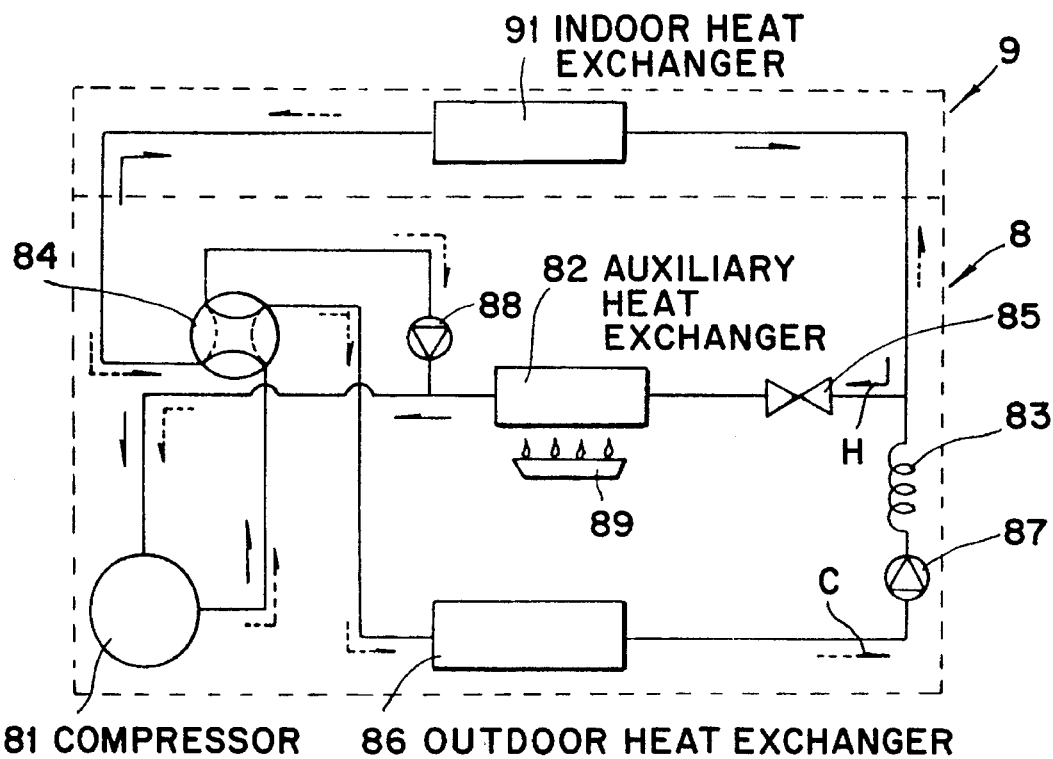
FIG. 1 is a schematic diagram conceptionally illustrating a refrigerant heat air conditioner according to prior art.
Figure 2:
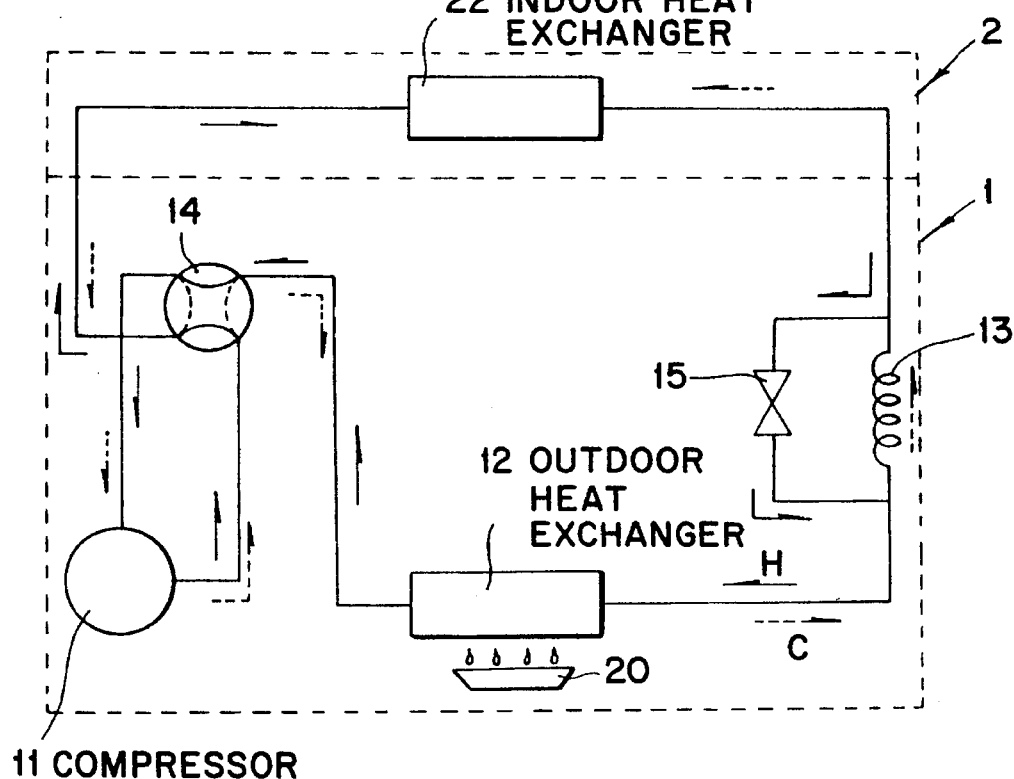
FIG. 2 is a schematic diagram conceptionally illustrating a refrigerant heat air conditioner according to the invention.

FIG. 2 represents the schematic diagram of an air conditioner according to the invention.

Figure 3:
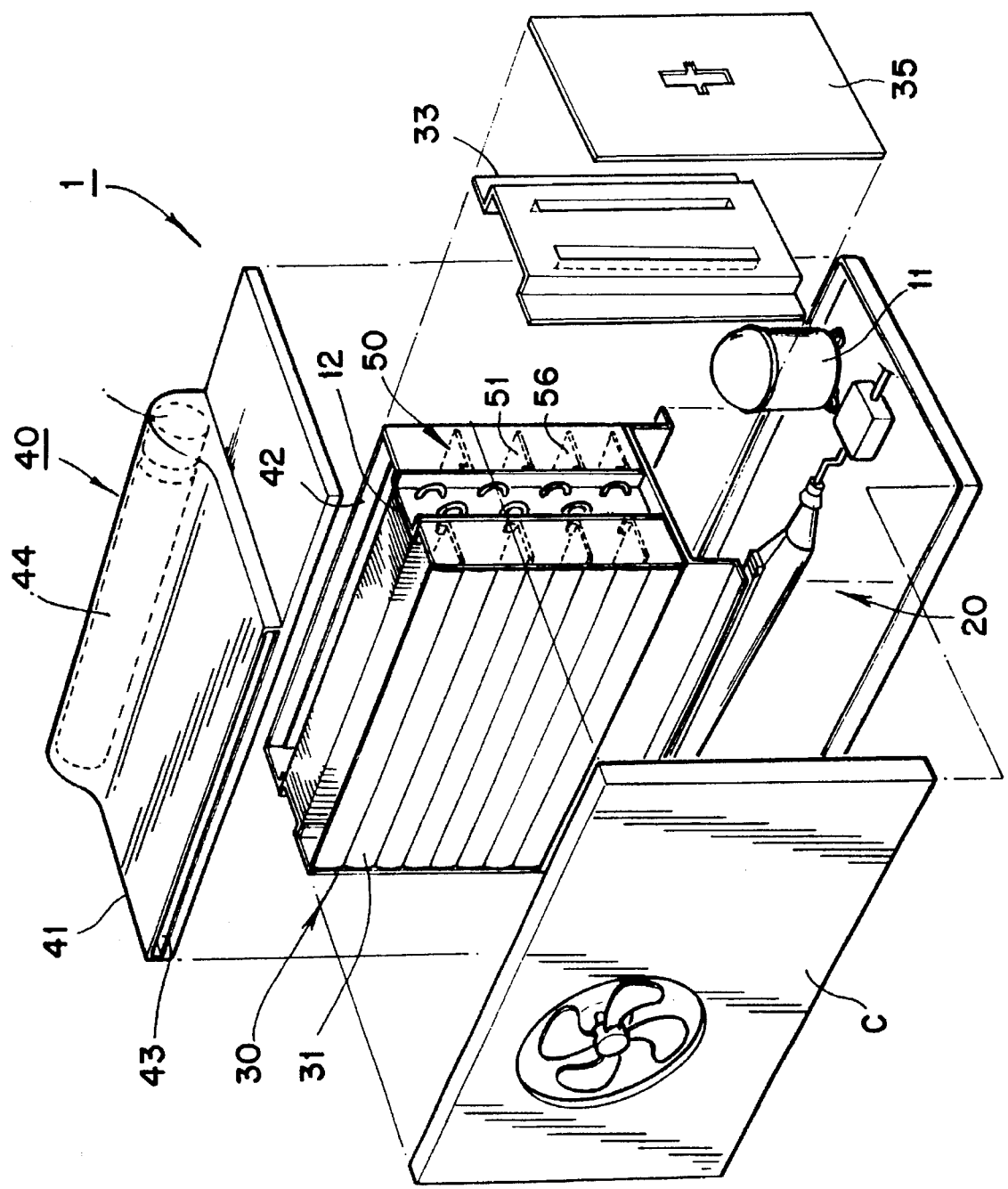
FIG. 3 is an exploded perspective of an external unit of FIG. 2.

The air conditioner comprises an external unit 1 and an internal unit 3. The external unit 1 comprises a compressor 11, an outdoor heat-exchanger 12 and an expansion tube 13 which are connected in sequence. A four way valve 14 is located between the compressor 11 and the outdoor heat exchanger 12. Between the expansion tube 13 and the four way valve 14 the internal unit 2 is mounted. Further, a two way valve 15 is connected in parallel with the expansion tube 13. The external unit 1 utilizing this cycle is shown in FIG. 3.

At the lower portion of the outdoor heat exchanger 12 a heating apparatus 20 is installed which heats the outdoor heat exchanger by an indirect heat. At the front surface and rear surface an interrupting means 30 (to be described in greater detail subsequently) is mounted for interrupting the air flowing into the inside of the external unit 1 when in the heating mode of the apparatus. Further, an exhaust means 40 is mounted above the outdoor heat exchanger 12. The exhaust means 40 permits the heated air generated by the heating apparatus 20 to flow out of the outdoor heat exchanger 12. A conducting means 50 is mounted at both the front surface and rear surfaces of the outdoor heat exchanger 12. The conducting means 50 is utilized so that heated air passes through the outdoor heat exchanger 12 evenly.

Figure 4:
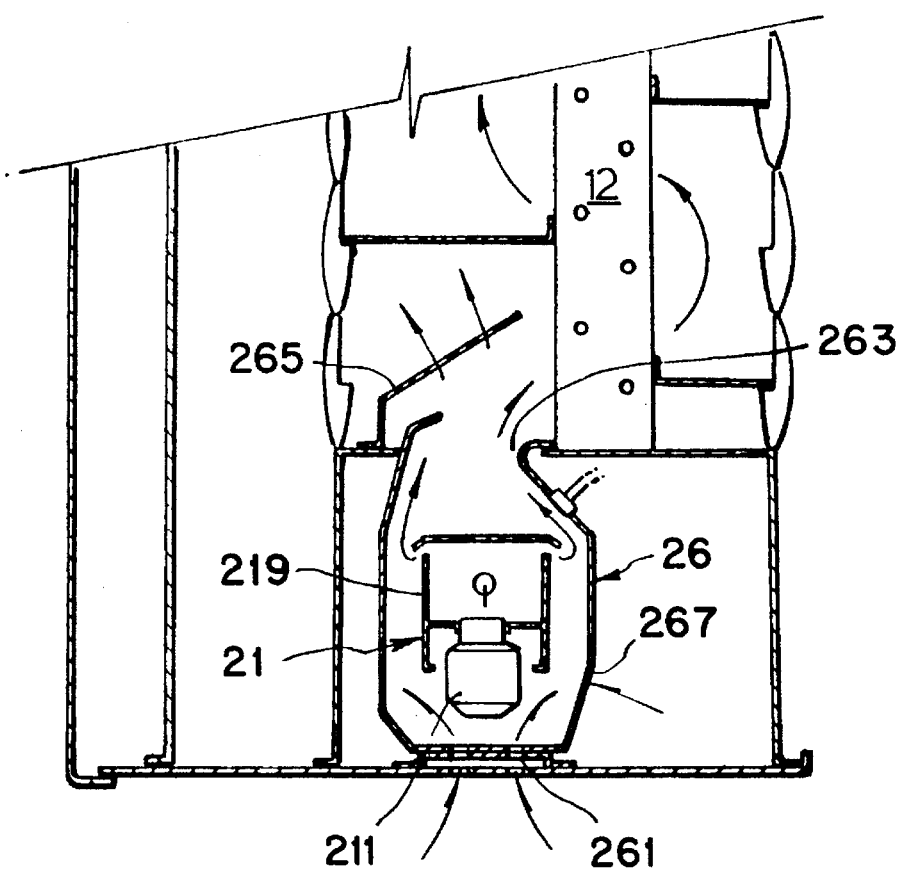
FIG. 4 is a side crosssectional view of a heating apparatus utilized in FIG. 3.
Figure 5:
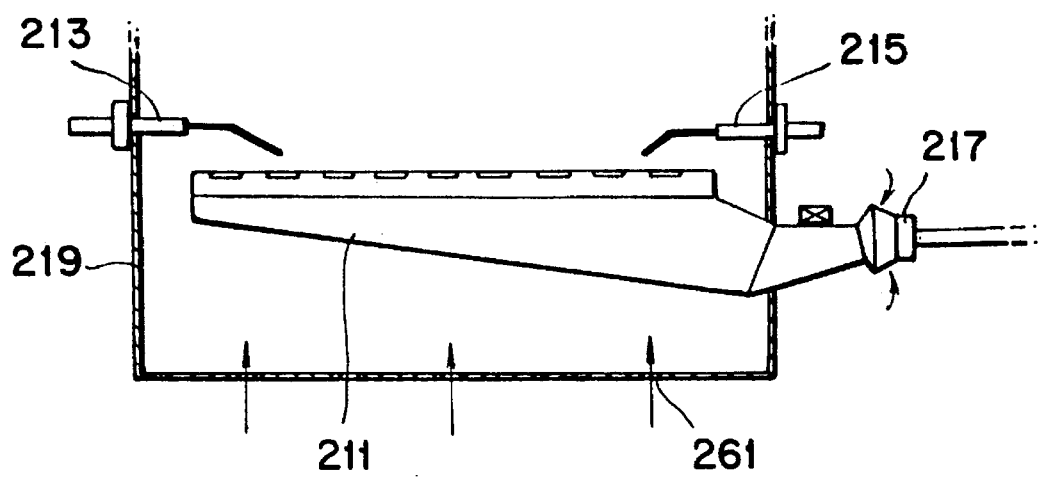
FIG. 5 is a front view of a heating apparatus shown in FIG. 3.

The heating apparatus 20 is shown in FIGS. 4 and 5 in detail. The heating apparatus 20 comprises an emitting member 21 having a gas burner 211 which is mounted at the lower part of the outdoor heat exchanger 12. The heating apparatus 20 further comprises a guiding member 26 which encloses the emitting member 21. The guiding member 26 is served as an inlet of the air for heating and an outlet for the heated air to flow toward the outdoor heat exchanger 12. In the emitting member 21, the burner 211 connected with a gas nozzle 217 is mounted horizontally. A cover 219 having a top opening is installed around the perimeter of the burner 211. At respective sides of the cover 219, a flame sensing rod 213 and an ignition rod 215 are mounted adjacent to respective ends of the burner 211. The guiding member 26 has a duct 267 which includes bottom and side walls having at air inlet holes therein and further includes an outgoing passage 263 at the top of the duct. Adjacent to the outgoing passage 263 a guiding plate 265 is formed in a sloping manner and is placed to induce the flame generated from the heating apparatus 21 toward the lower portion of the outdoor heat exchanger 12. Further, the guiding plate 265 has a plurality of holes to pass a part of the gas for preventing the overheating of the gas at the outgoing passage 263.

Figure 6:
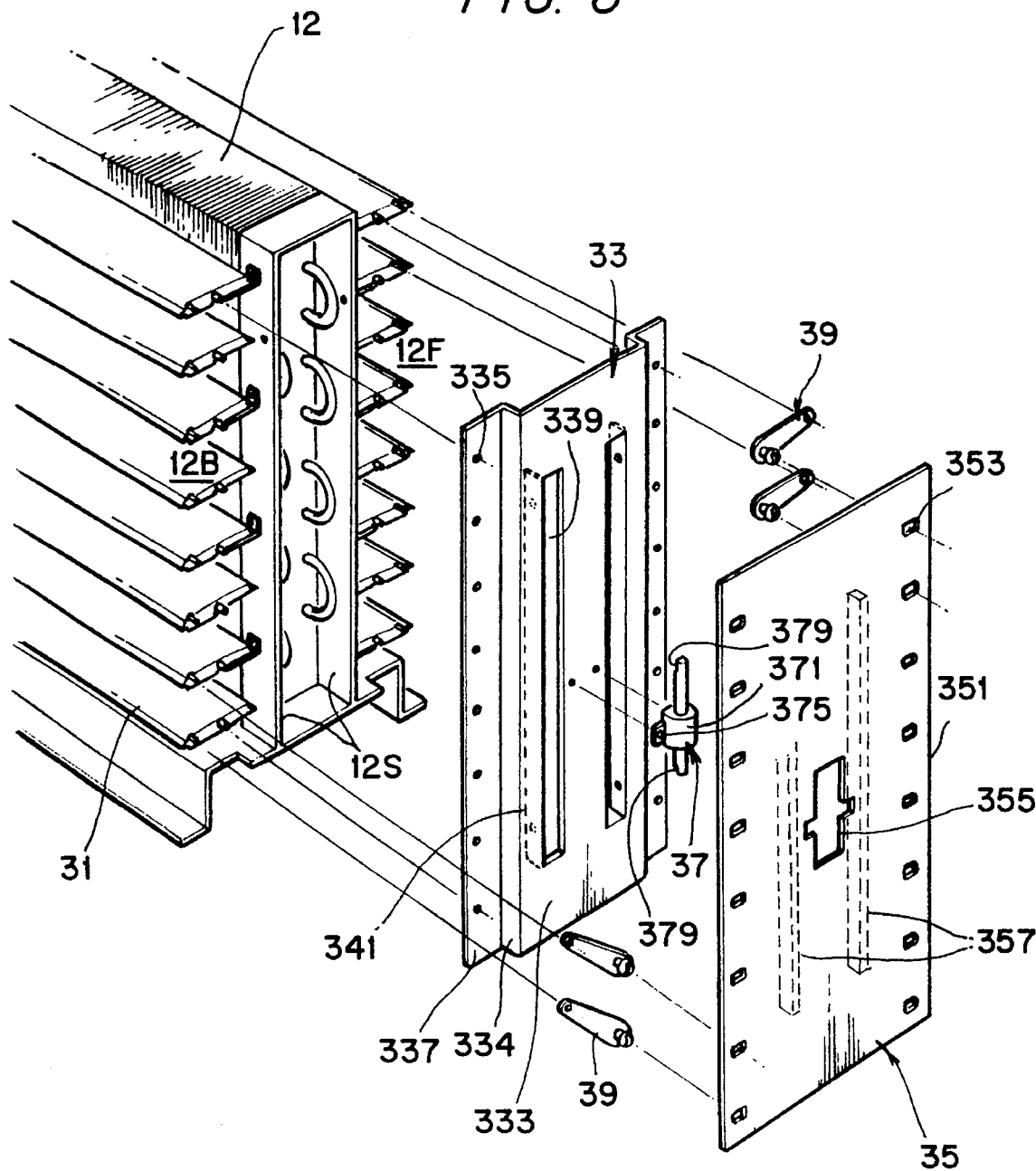
FIG. 6 is an exploded perspective view of an interrupting means of an outdoor heat exchanger utilized in FIG. 3.

FIG. 6 illustrates the interrupting means 30. The interrupting means 30 comprises a plurality of blades 31 which are pivotedly placed at the front and rear surfaces of the outdoor heat exchanger 12. The closed position i.e. the horizontal position of the blades 31 creates passages 12B, 12F for guiding the gas of the heating means 20. The interrupting means 30 further comprises a fixed member 33 which extends along both sides of the outdoor heat exchanger 12 and forms a pivot mounting a hinge pin 313 of each of the blades 31. At the middle of the fixed member 33 is a solenoid 37 which is located for producing vertical movement of an elevation member 35 which is placed at the outside of the fixed member 33. Between the fixed member 33 and the elevation member 35 a plurality of links 39 are hingedly installed (only four depicted in FIG. 6).

Figure 8:
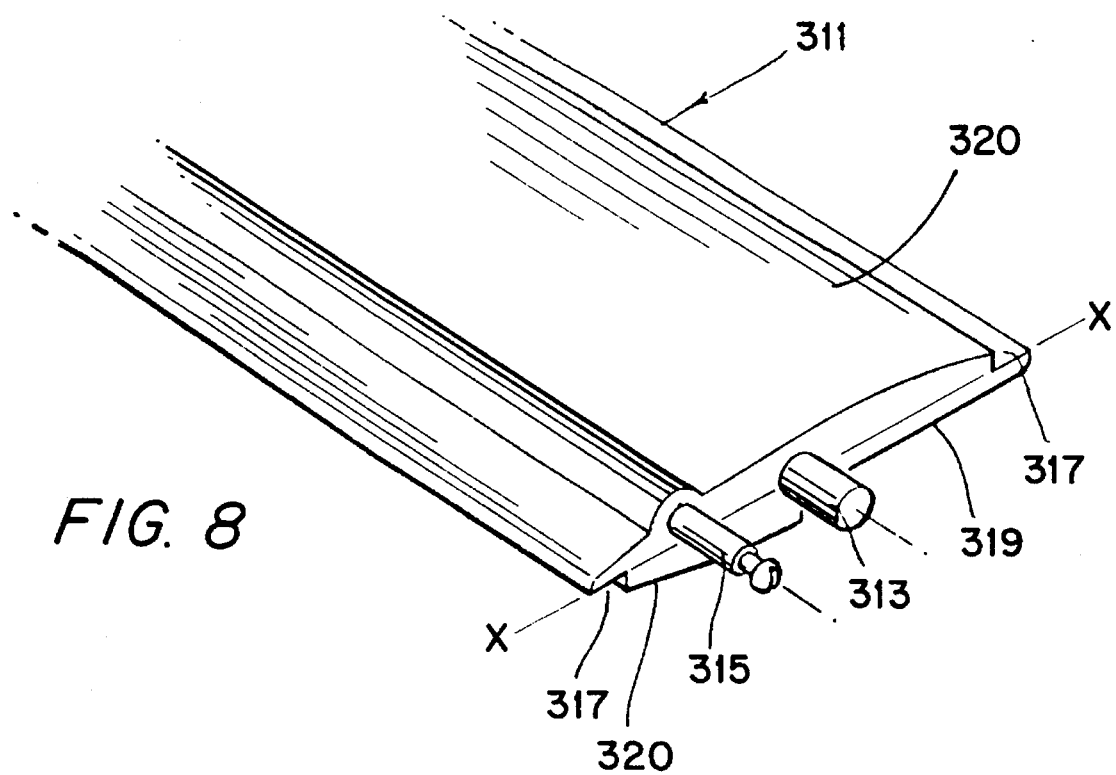
FIG. 8 is a partial perspective view of a blade utilized in FIG. 6.

The blade 31, shown in FIG. 8, has a body 311 which is a rectangular shape and a hinge pin 313 which is formed at each end of the body 311. One hinge pin 313 of the blade is pivotably mounted to the fixed member 33 and the other hinge pin (not shown) is pivotably mounted to another fixed member disposed at an opposite end of the heat exchanger 12. At the outward tip of each blade a swing pin 315 is mounted wherein the longitudinal length of the swing pin 315 is longer than that of the hinge pin 313. The mounting point of the swing pin 315 is higher than the horizontal mid-plane X—X of the blade 31 which contains the pin 313. An "L" shape notch 317 is formed at the lower surface of the outward tip of each of the blades 31 and also at the upper surface of the inward tip thereof, respectively. The bottom surface of the notch 317 lies in the plane X—X of the blades 31. At the lower surface of the inward foil of the body 311 a flattened surface 319 is formed, while at the lower surface of the outward foil of the body 311 and along the entire upper surface of the body 311 an arch shape 320 is formed.

In FIG. 6, the fixed member 33 comprises a rectangular body having a side wall 333 and a fixing plate 337. The side wall 333 is bent inwardly at both vertical edges thereof to form a step surface 334. A guiding portion 397 of the link 39, which is described later, slides along a track defined by the plate 337 and surface 334. The fixing plate 337 has a plurality of openings 335 spaced along the vertical direction into which the hinge pins 313 of the blades 31 are inserted. At the middle of the body 331 a couple of slots vertical 339 are formed by a punching operation. The punched material of the slot 339 is bent toward the inside of the body 331 so as to attach to the inner wall 12S of the side end or the outdoor heat exchanger 12.

Figure 7:
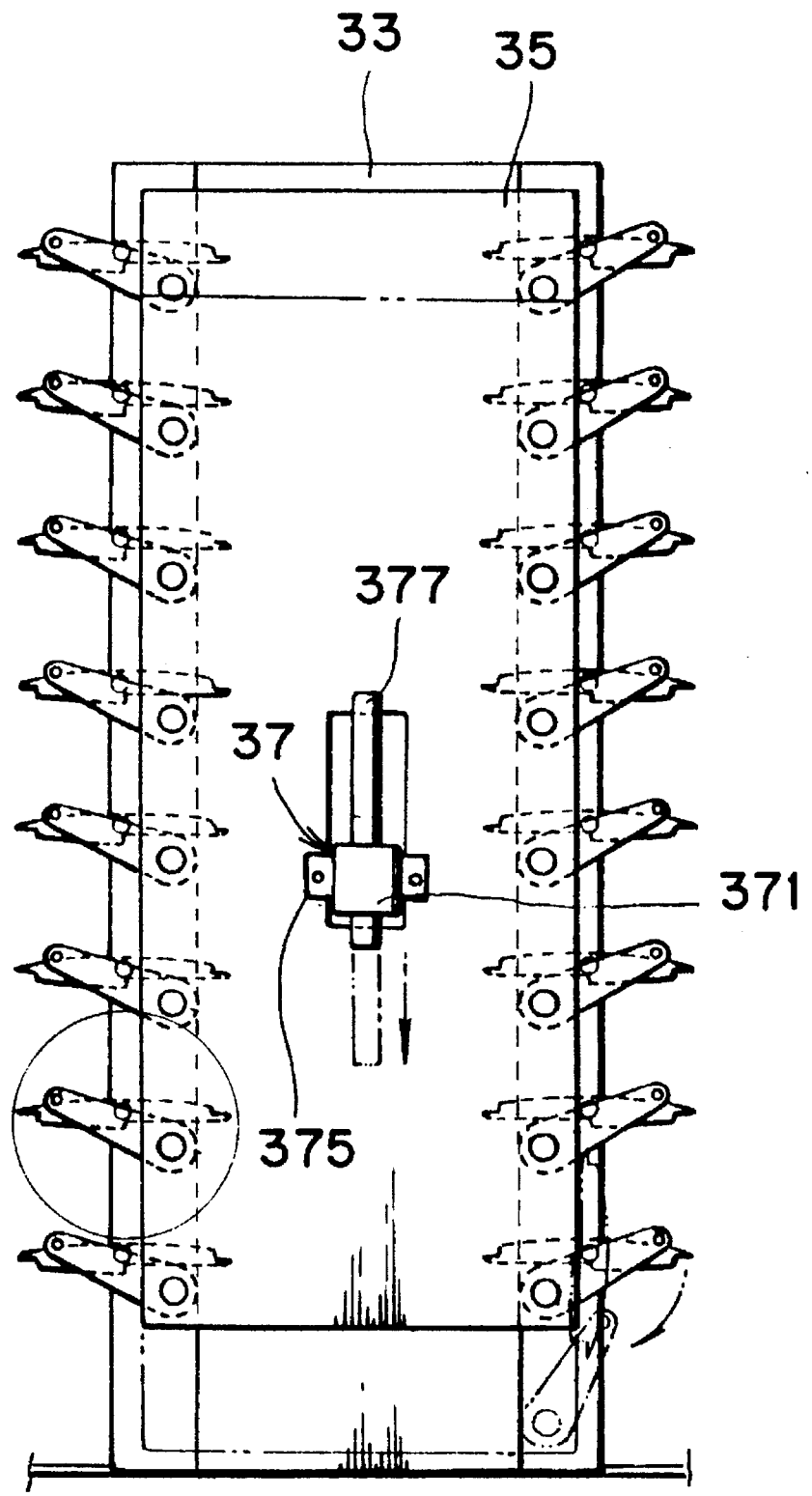
FIG. 7 is a side view of an interrupting means shown the operation of the interrupting means in FIG. 6.

The elevation member 35 comprises a body 351 and an opening 355 formed at the middle of the body 351, through which the solenoid 37 is installed as shown in FIG. 6. The body 351 has a rectangular shape and the horizontal width of the body 351 is smaller than that of the fixed member 33 (see FIG. 7). The body 351 has a plurality of horizontal slots 353, into which the hinges of respective link 39 are assembled, at both sides of the heat exchanger 72. A couple of brackets 357 are mounted at the inner surface of the body 351 and are inserted in the slots 339 of the fixed member 33 to guide the vertical movement of the elevation member 35.

The solenoid 37 (FIGS. 6 and 7) comprises a cylindrical body 371 and a fastening plate 375 which is extended from the rear of the body 371. The solenoid 37 is fastened on the outside surface of the fixed member 33. The solenoid further comprises a shaft 377 which slides in the body 371. At both ends of the shaft 377 a groove 379 is formed for contacting a respective one of the upper edge and lower edge of the opening 355 of the elevation member 35.

Figure 10:
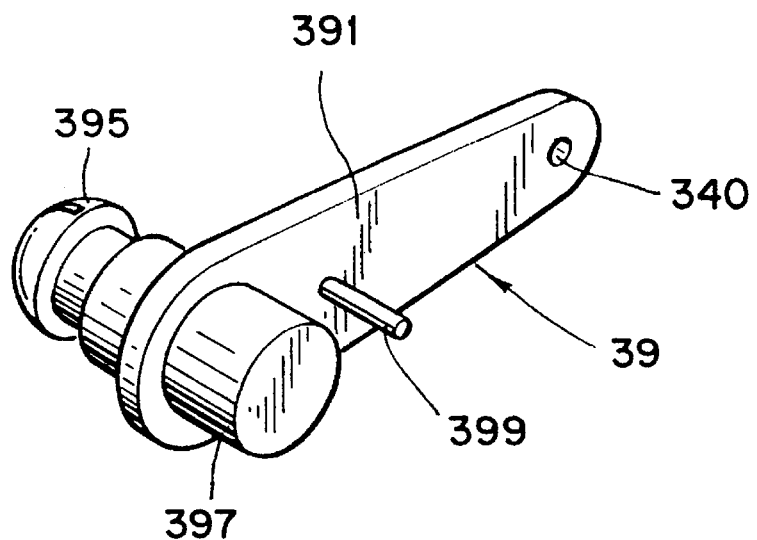
FIG. 10 is a perspective view of a link in FIG. 9.
Figure 11:
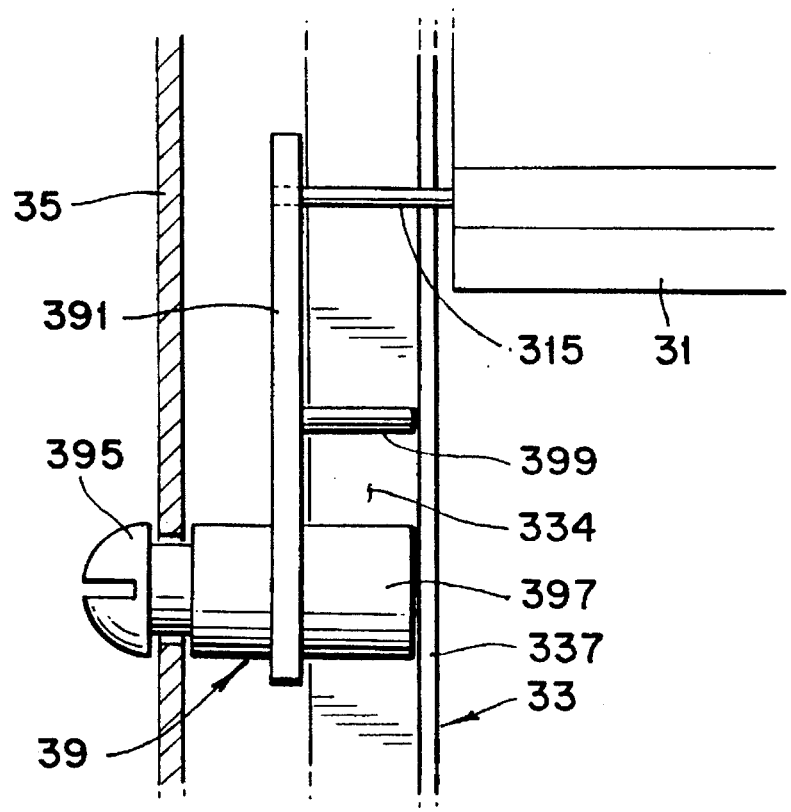
FIG. 11 is an assembled view of the link which is connected with a blade and an elevation guide means and is supported with a fixing member.

In FIGS. 10 and 11, the link 39 comprises a hinge 395 which is vertically formed at one end of a body 391 for connecting to the elevation member 35, and a protruding member 397 which is in the opposite side of the hinge 395 for contacting the side wall 333 of the fixed member 33. The link 39 further comprises a supporting pin 399 at the middle of the body 391, wherein the height of the pin 399 equals that of the protruding member 397. Next, the link 39 has a hole 340 at the other end of the body 391 for engaging with the swing pin 315 of the blades 31.

The exhaust means 40 comprises a cover 41 and a cross fan 44 installed in the cover 41 shown in FIGS. 3 and 13. The cover 41 sits above the outdoor heat exchanger 12 and creates an outgoing passage 42 which is the upper point of the gas passage 12B which is bordered by the vertically arrayed blades 31. The cover 41 further has an exit opening 43 which directs toward the left side in FIG. 13. The cross fan 44 draws the heated air in the gas passage 12B through the outgoing passage 42 and blows it out through the exit opening 43.

Figure 9:
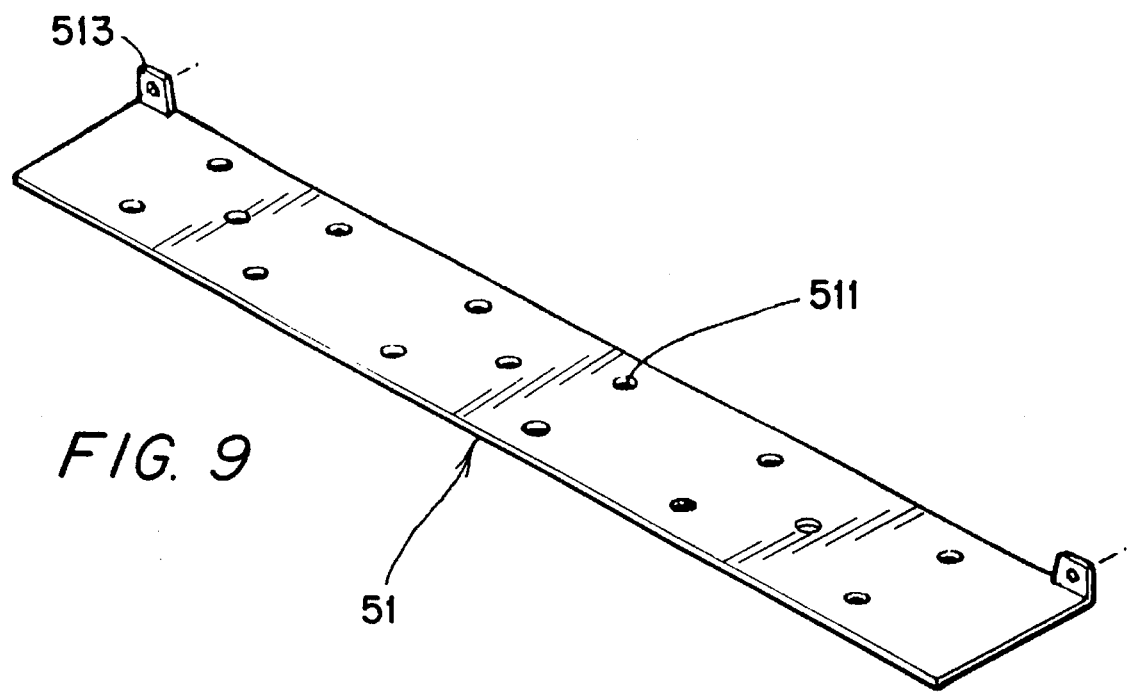
FIG. 9 is a perspective view of a first conducting means in FIG. 4.

The conducting means 50 comprises a first conducting member 51 shown FIG. 9 and a second conducting member 56. The first conducting member 51 has a rectangular body having a plurality of openings 511 therein and the width of the conducting member is enables the member to be placed in each of the gas passages 12B,12F. The first conducting member 51 further comprises a hanging plate 53 which is extended from the side end thereof. In contrast, the second conducting member 56 has the same configuration as the first conducting member 51 except for omitting the openings 511 of the first conducting member 51. The first conducting member 51 and the second conducting member 56 are arranged at the front surface and the rear surface of the outdoor heat exchanger 12 in a zig-zag manner as shown in FIGS. 3 and 13. Above all, the second conducting member 56 is mounted adjacent to the outgoing passage 233 of the heating apparatus 20. The first conducting member 51 is placed at the bottom of the air passage 12B opposite to the second conducting member 56.

An operation of the above described air conditioner will now be described.

In the cooling mode, shown by arrow "C" in FIG. 2, the refrigerant that is compressed by the compressor 11 flows into the outdoor heat exchanger 12 through the four way valve 14, thereby heat-exchanging with the circumferential air. After passing the outdoor heat exchanger 12 the gaseous refrigerant is changed into liquified refrigerant, thus flowing into the expansion tube 13. By the effect of the expansion tube 13 the liquid under high pressure is transformed into a low pressure liquid refrigerant. The liquid refrigerant goes into the indoor heat-exchanger 22 and there the liquid refrigerant is evaporated, and then it flows back into the compressor 11 via the four way valve 14. The cycle is repeated in the above sequence to perform the cooling operation.

Furthermore, in the interrupting means 30 of the external unit 1 the blades 31 are horizontally positioned as shown in FIG. 14, 50 the air incoming portion 16 and the air outgoing portion 17 are consequently opened and the cross fan 44 of the exhaust means 40 stops. At this time the blower 18, which is mounted in the inside of the outgoing portion 17, operates so that the air passes through the outdoor heat exchanger 12, thereby achieving the cooling mode.

In the heating mode, shown by arrow "H" in FIG. 2, a high temperature refrigerant gas under high pressure is discharged from the compressor 11 and flows into the indoor heat exchanger 22 through the four way valve 14. The indoor air is heat-exchanged at the indoor heat exchanger 22 in which the gaseous refrigerant is converted into liquefied refrigerant. The liquid refrigerant is directed to the outdoor heat exchanger 12 via the two way valve 15. The heater 20 heats the refrigerant of the outdoor heat exchanger 12 so as to convert it into gaseous refrigerant. The gaseous refrigerant returns to the compressor 14. The above cycle is repeated in the above sequence to perform the heating operation.

In the heating mode, electrical power is supplied to the solenoid 37 (FIGS. 6 and 7) and the shaft 377 moves downward. Thus, the lower groove 379 of the shaft 377 pushes the lower edge of the opening 355 of the elevation member 35 so as to move downward the elevation member 35. The downward movement of the elevation member 35 induces rotation of the links such that the horizontal position of the link 39 illustrated by the chain line "I" (FIG. 12) changes into the vertical position of the link 39 illustrated by the solid line "II". During the movement of the link 39, The protruding member 397 contacts and moves down along the step surface 334 and the outer surface of the fixing plate 337 as shown in FIG. 11. The supporting pin 399 moves also down along the outer side of the fixing plate 337.

This causes the swing pin 315 of the blade 31 to rotate about the hinge 353 (counterclockwise in FIG. 12) by a 90 degree angle. The outside notch 317L, i.e. the left hand notch in the drawing, sealingly contacts the inside notch 317BR of the lower blade 31B, while the inside notch 317R sealingly contacts the outside notch 317TL of the upper blade 31T. The blades are thus vertically arranged to create an air tight wall as shown in FIG. 13.

In this condition, the outside air cannot come through the incoming portion 16 and the outgoing portion 17, the blower 18 is stopped, and the cross fan 44 of the exhaust means 40 operates so as to induce the blowing force.

The heated air generated by the heating apparatus 20 travels to the air passage 12F from the outgoing passage 263. However, the upward flow in the air passage 12F is interrupted by the second conducting member 56F and the air flow passes through the fins of the outdoor heat exchanger 12 to reach the air passage 12B. The air passage 12B is interrupted by the second conducting member 56S and the air flows to the air passage 12F. Most of the air is directed to the air passage 12B by the first conducting member 51S. A part of the air flows through the openings 511 of the first conducting member 51S. According to the above air flow procedure, the air reaches the outgoing passage 42 and finally flows out through the exit opening 43 by the operation of the cross fan 44. During the zig-zag flow of the heated air, the heat of the air is transmited to the refrigerant of the outdoor heat exchanger 12, thereby achieving the heating mode.

Figure 12:
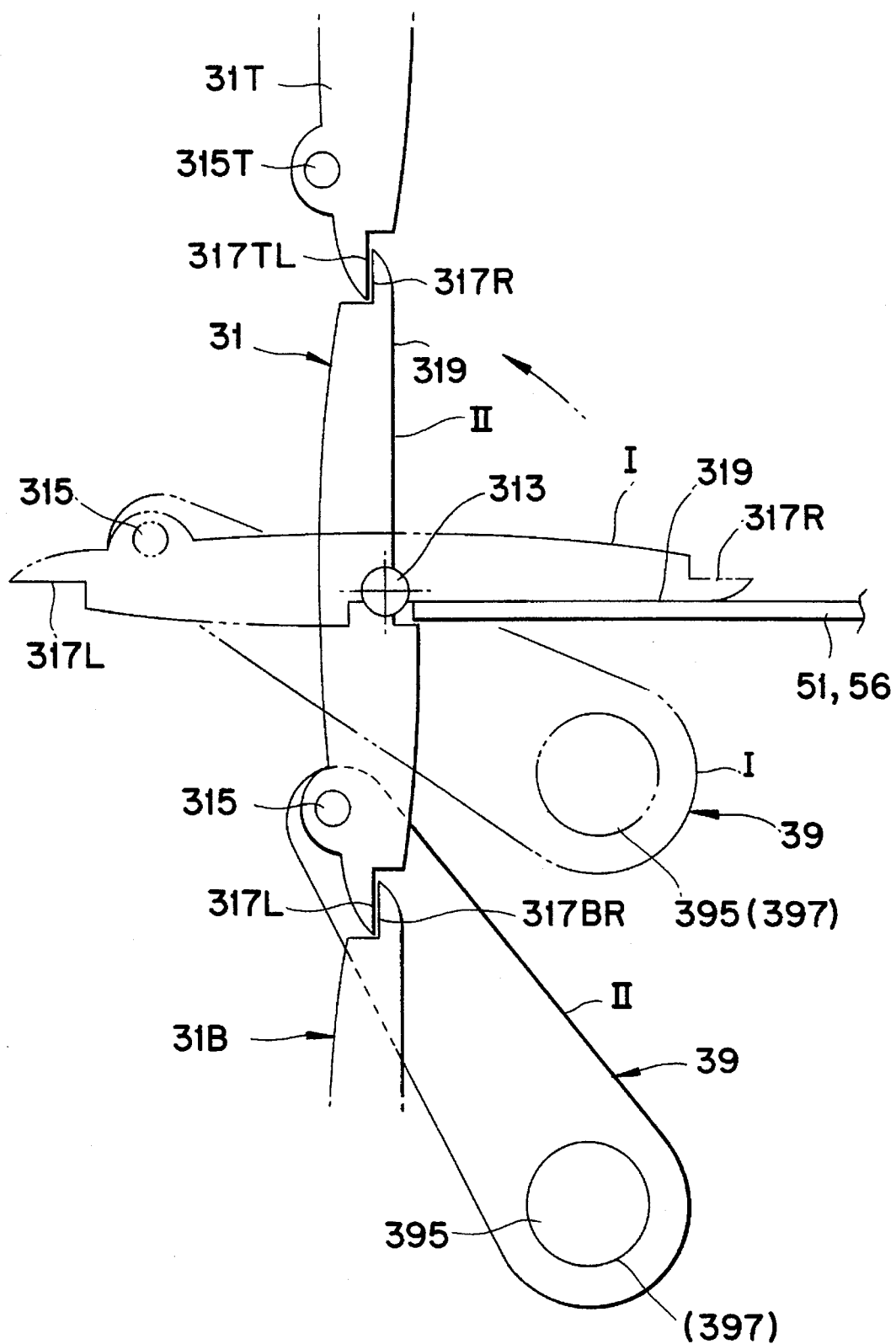
FIG. 12 is a partial enlarged view of an operation of the interrupting means in FIG. 7.

Turning to the cooling mode, the solenoid 37 (FIG. 7) operates to move up the elevation member 35. The vertical position of the blades 31 (solid line II) in FIG. 12 are changed into the horizontal position of the blades 31 (chain line I). The external unit employing that state is shown in FIG. 14. In this mode the heating apparatus 20 and the cross fan 44 no longer operate and only the blower 18 operates so as to release the heat of the outdoor heat exchanger 12, thereby achieving the heating mode.

FIGS. 15 and 16 illustrate another embodiment of the present invention. The same component parts as those in the previous figures are designated by the same reference numerals as in the previous figures and therefore they will not be explained further.

The external unit comprises an exhaust means 60 which has a different shape than the exhaust means 40 employed in the previous embodiment. The exhaust means 60 comprises a case 61 which is placed above the outdoor heat exchanger 12, and the interrupting means 30, and encompasses the interior members 12,30 to create the air duct 69. The incoming portion of the air duct 69 forms an incoming passage 63, while the exit portion of the air duct 69 forms the outgoing opening 65. Further, the case 61 has a plurality of the openings 67 adjacent to the incoming passage 63. The incoming passage 63 is placed on a higher plane than the outgoing opening 65. In the heating mode, the blades 31 are arranged vertically as shown in FIG. 15 to create the air passages 12B,12F. The heated air via the air passages 12B,12F flows into the air duct 69 and finally is blown out through the outgoing opening 65. On the contrary, in the cooling mode the blades 31 are arranged horizontally as shown in FIG. 16. The outgoing opening 65 is closed by the blades 31 and the air flow is permitted only through the air incoming portion 16 and the air outgoing portion 17. The air flows in the heating and cooling modes are created by the blower 18, thereby eliminating the need for the fan 44.

What is claimed:

1. An air conditioner for heating and cooling, comprising:
   a compressor, an indoor heat exchanger, an expansion tube, an outdoor heat exchanger, and refrigerant conduits interconnecting said compressor, indoor heat exchanger, expansion tube and outdoor heat exchanger to conduct refrigerant from said compressor sequentially to said outdoor heat exchanger, said expansion tube and said indoor heat exchanger and then back to said compressor during a cooling mode, and to conduct refrigerant from said compressor sequentially to said indoor heat exchanger, said expansion tube, and said outdoor heat exchanger and then back to said compressor during a heating mode, said outdoor heat exchanger including:
   a housing,
   a set of heat exchange coils in said housing for conducting refrigerant in both said heating and cooling modes,
   a heater disposed adjacent to said set of coils and being operable only during said heating mode for heating the refrigerant as the refrigerant passes through said coils,
   a passage-forming structure connected to said housing and being movable between first and second positions, wherein in said first position a first flow passage is formed for conducting ambient air across said coils in said cooling mode, and in said second position a second flow passage is formed for conducting heated air from said heater across said coils in said heating mode, said second flow passage being of zig-zag configuration extending through said coils alternatingly from opposite ones of said sides,
   a first air flow generator operable only when said passage-forming structure is in said first position for generating an air flow through said first passage, and
   a second air flow generator operable only when said passage-forming structure is in said second position for generating an air flow through said second passage to conduct heat from said heater across said coils.

2. An air conditioner according to claim 1, wherein said first flow passage is generally horizontal, and said second flow passage is generally vertical.

\* \* \* \* \*